Aug. 24, 1954  F. L. SHANNON  2,687,191
EMERGENCY BRAKING AND ANTIJACKKNIFING
DEVICE FOR TOWED VEHICLES

Filed July 16, 1952  3 Sheets-Sheet 1

Witness
Edward P. Seeley

Inventor
Fred L. Shannon
by Talbert Dick & Adler
Attorneys

Aug. 24, 1954  F. L. SHANNON  2,687,191
EMERGENCY BRAKING AND ANTIJACKKNIFING
DEVICE FOR TOWED VEHICLES
Filed July 16, 1952  3 Sheets-Sheet 2
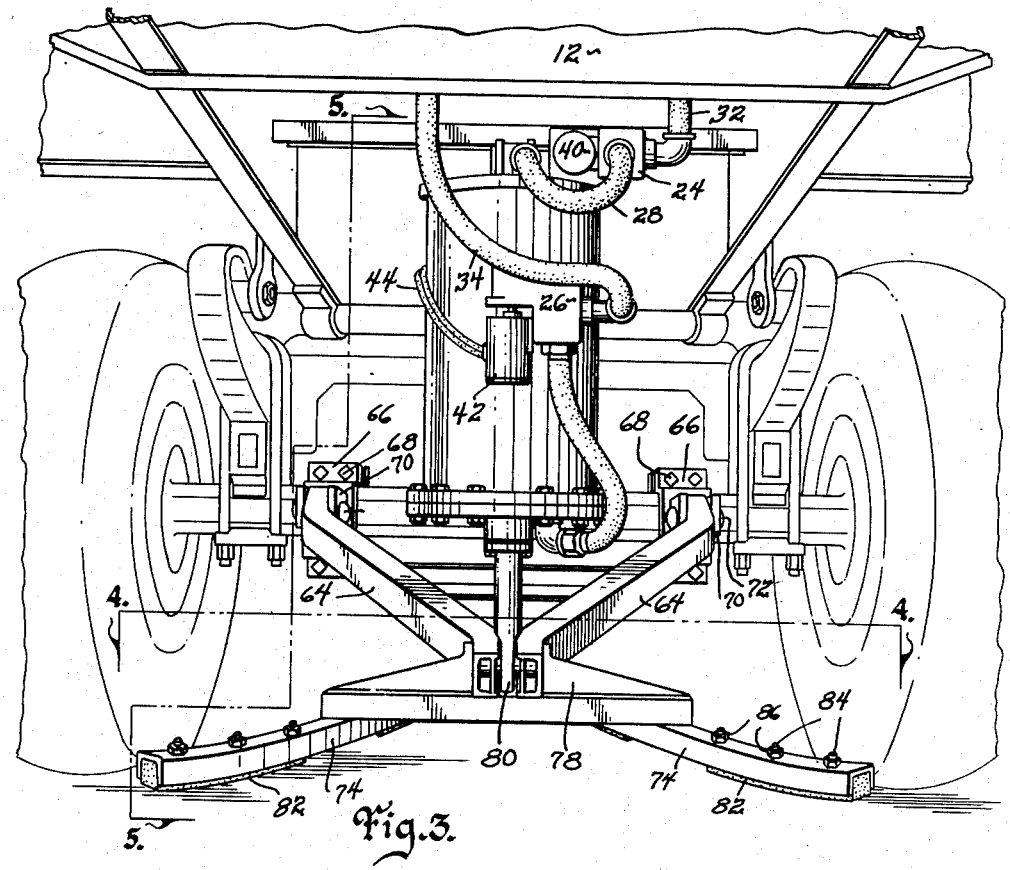
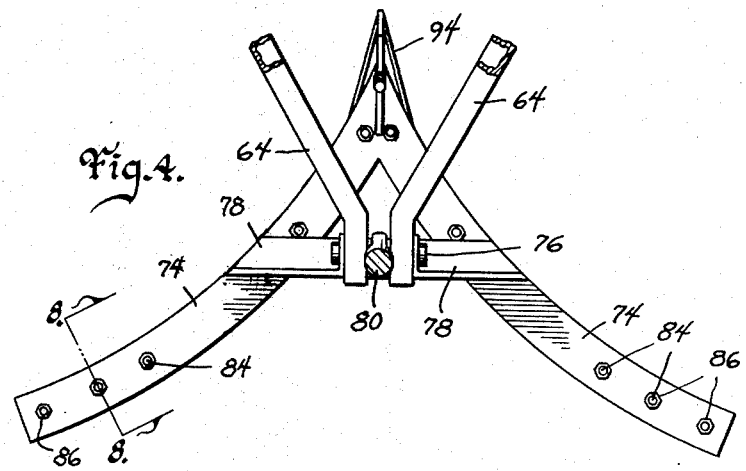
Inventor
Fred L. Shannon
by Talbert Dick & Adler
Attorneys
Witness
Edward P. Seeley Aug. 24, 1954 — F. L. SHANNON — 2,687,191
EMERGENCY BRAKING AND ANTIJACKKNIFING
DEVICE FOR TOWED VEHICLES
Filed July 16, 1952
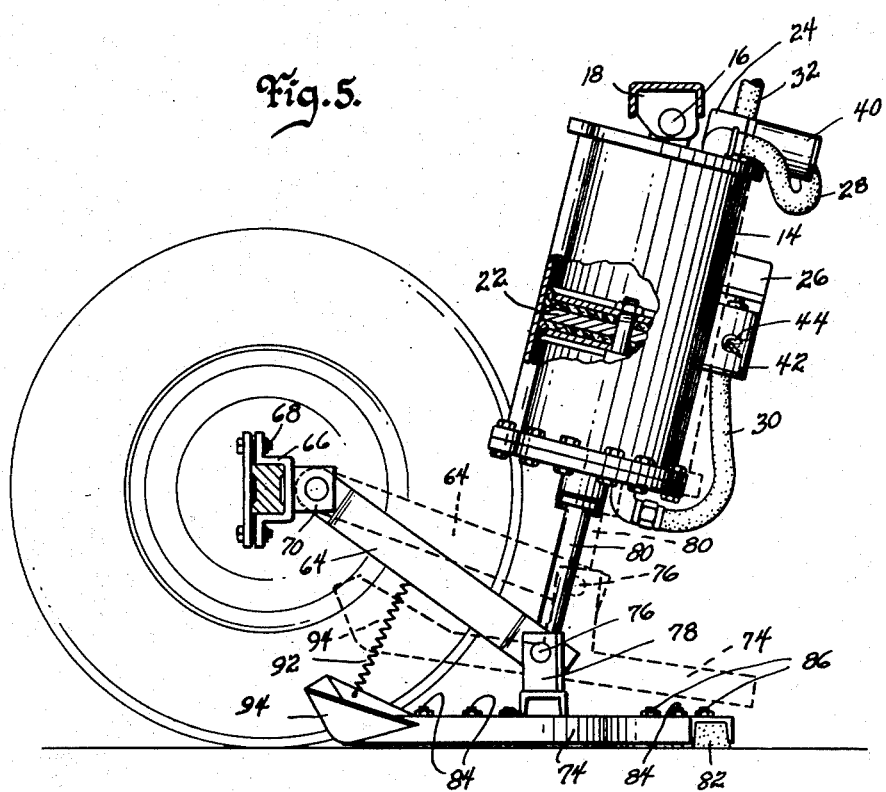
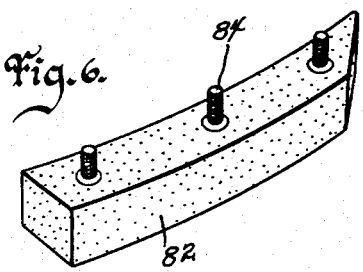
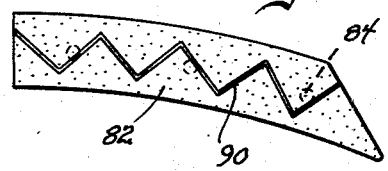
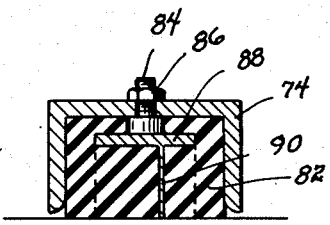
Inventor
Fred L. Shannon
by Talbert Dick & Adler
Attorneys

UNITED STATES PATENT OFFICE 2,687,191

EMERGENCY BRAKING AND ANTIJACK-KNIFING DEVICE FOR TOWED VEHICLES

Fred L. Shannon, Des Moines, Iowa

Application July 16, 1952, Serial No. 299,148

2 Claims. (Cl. 188—234)

My invention is a safety device for towed vehicles. Specifically I have invented a vehicle mounted road surface engaging element and a mechanism for bringing it into contact with a road surface at the discretion of the driver of the towing vehicle.

While I do not wish to limit myself to any particular form of towed vehicle, I shall discuss my invention specifically in connection with semi-trailers and tractors of the type commonly used on the highways in the United States. The device was developed in connection with these semi-trailers and they afford an excellent example of the need for and advantages of my invention. These large trucks are very satisfactory for road travel under normal conditions. There are road conditions of weather that cause roads to be slippery and under these conditions a truck of the type under discussion is apt to get into an uncontrollable skid in which the towed portion of the truck tends to move more rapidly than the towing portion of the truck and the trailer then gets in a position at a sharp angle to the tractor which situation is known as "jackknifing."

Many attempts have been made to avoid this situation. Most of these attempts have resulted in devices that are aimed at preventing the trailer and tractor from assuming a relation to each other that is less than a certain predetermined degree of angularity. While such devices are better than no aids of any kind, it is my opinion that they fall short of a real solution to the problem.

As is known by any person familiar with the art of operating a towing and towed vehicle combination, the brakes of the towed vehicle are always applied first. The inertia of the tractor then tends to keep the two units aligned. When a trailer and tractor rig begins to jackknife, therefore, traction between the rig and the roadway surface has been lost. Any chains, stops or other mechanical devices that act solely on the rig will not prevent the skidding, therefore, although they may limit the extent of the "jackknifing" that can occur. Since some of the damage to the rig and driver is usually a direct result of jackknifing whenever the entire accident involves skidding, obviously limiting chains or the like are beneficial. Equally obvious, however, any stops or limiting means to prevent "jackknifing" will not prevent the entire rig from skidding. This limitation on the beneficial results that can be obtained with mechanical limiting means which act solely on the rig is not the only shortcoming of the devices previously involved in attempting to solve this problem.

Another shortcoming of mechanical limiting means is the loss of time and effort caused to the driver of the rig in using these devices. Although limiting the angularity of the trailer with respect to the tractor does not generally interfere with normal driving, it does inhibit parking of these semi-trailer trucks. Not only persons skilled in the art, but almost anyone who has observed these large semi-trailer trucks parked at loading docks where space is limited has observed that these trucks are usually positioned in what is essentially known as a "jackknifing" position. In fact this is one of the essential benefits of using a semi-trailer truck as distinguished from a truck which has no joint at its juncture between the cab and the bed. An occasion also when a very sharp turn is made the tractor sometimes bends at a greater angle than is normally acceptable for anti-jackknifing limiting devices. For these reasons it is necessary for the operator to disconnect his limiting device at times in order to permit a greater degree of angularity between the tractor and trailer than is acceptable for normal road operation.

In view of the foregoing, therefore, it is the principal object of my invention to provide an emergency braking and anti-jackknifing device for towed vehicles that operates to increase the traction between the towed vehicle and the roadway over which it is being towed.

It is a further object of my invention to provide an emergency braking and anti-jackknifing device for towed vehicles that can be actuated without loss of time or effort on the part of the operator.

It is a further object of my invention to provide an emergency braking and anti-jackknifing device that does not limit the degree of angularity between the towed and towing vehicles.

It is a further object of my invention to provide an emergency braking and anti-jackknifing device that may be operated and released by the driver of the towing vehicle while both vehicles are in motion.

It is still a further object of my invention to provide an emergency braking and anti-jackknifing device that will operate equally well on substantially any road surface regardless of the type of surface on the roadway.

It is a further object of my invention to provide an emergency braking and anti-jackknifing device that is mechanically simple, and, therefore, inexpensive to manufacture and durable in use.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 3 is a rear elevation view of my invention shown installed on a fragmentary disclosure of a semi-trailer.

Fig. 4 is a plan view of the ground surface engaging shoe and taken on the line 4—4 of Fig. 3. Fragments of the connecting linkage are also shown.

Fig. 5 is a side elevation view of my invention shown in relation to a vehicle wheel and axle with portions of the device broken away to more fully illustrate its construction and taken on the line 5—5 of Fig. 3. Broken lines illustrate an adjusted position of the device.

Fig. 6 is a perspective view of a single ground engaging shoe insert block drawn to an enlarged scale.

Fig. 7 is a bottom view of the shoe disclosed in Fig. 6 and drawn to the same scale as that figure.

Fig. 8 is a still further enlarged cross-sectional view of a shoe arm and the block insert; the view being taken on line 8—8 of Fig. 4.

Figure 1:
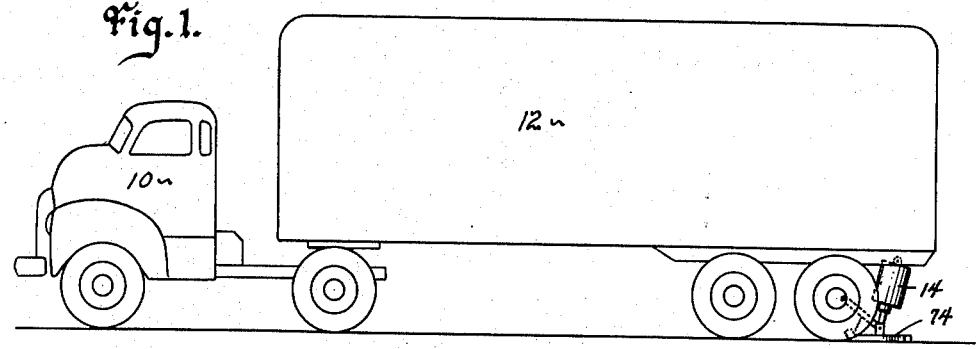
Fig. 1 is a reduced side elevation diagrammatic view of a semi-trailer truck equipped with my invention. Broken lines illustrate hidden parts.

Referring to the drawings I have used the numeral 10 to designate an ordinary tractor of the type commonly used with semi-trailers such as the one designated 12. At any convenient point near the rear of the semi-trailer 12 I mount a rapid acting device capable of exerting a downward thrust. I have found through experiment that a pneumatic cylinder such as the one designated 14 is very satisfactory for this purpose. This cylinder is pivotally secured to the underside of the trailer frame as shown in Fig. 5 by any suitable means such as the pin 16 extending through the pierced ears 18 and the pierced boss 20 of the cylinder. Within the cylinder is the usual piston 22 which forms a substantially airtight seal with the cylinder walls. Appropriate valves such as the ones designated 24 and 26 control the admission of air to the cylinder.

Appropriate hoses or conduits of some nature such as the ones designated 28 and 30 connect the valves to respective ends of the cylinder. The hoses indicated by the numeral 32 and 34 respectively connect the valves to an air-tank which is shown only in the schematic diagram. This tank is designated by numeral 36. The tank is supplied with air under pressure from any suitable source such as the conventional air-brake system through the conduit designated 37 having a check-valve which valve is designated 38. The valves 24 and 26 may also incorporate check valves to prevent any flow of air through these valves back toward tank 36. These valves are of the conventional type which either connect the tank 36 to the interior of the cylinder or connect the interior of the cylinder to the surrounding atmosphere while sealing off the line leading to the air tank.

These valves are controlled from the cab of the truck by an electrical system incorporating a pair of solenoids. These units are designated by the numerals 40 and 42 respectively. The coils of the solenoids are connected in parallel to each other by any suitable wiring such as the leads designated 44. A second pair of leads shown in the wiring diagram only and designated 46 and 48 connect the coils to a quick-disconnect coupling of a conventional type and designated 50. The coupling is also connected to a manually controlled switch designated 52 which interrupts the circuit to any suitable source of power such as the battery 54. The leads connecting the coupling to the switch and the switch to the battery are designated 56 and 58 respectively. Switch 52 is located in any convenient place in the cab and is here shown as preferably mounted on the steering-wheel post 60. A lead 62 also connects the coupling to the frame or ground of the truck electrical system. The electrical control system is obviously very simple.

Below the pneumatic cylinder a yoke designated 64 is hingedly secured to the vehicle in any suitable manner. I have shown it in Figs. 3 and 5 as being preferably secured to the rear axle of the vehicle by means of the special brackets 66 which are secured to the axle in any suitable manner as by the bolts 68. Each bracket presents a pair of pierced ears 70 between which the ends of the yoke extend and are secured therein by a suitable pin such as that designated 72. The yoke arms are also hingedly secured to the shoe 74 by means of a pin or the like such as the one designated 76 which extends through the yoke arm, the shoe bracket 78 and the end of the piston rod 80 of pneumatic cylinder 14. The bracket 78 is rigidly secured to the frame of shoe 74 and any motion of the pneumatic cylinder piston is transmitted to the shoe and yoke. The shoe itself may be made in any suitable form, but I have found from experiment that the curved sided V-shape illustrated in Fig. 4 is a particularly desirable one. The shoe is constructed of channel elements and resilient or fibrous block members 82 are secured in the channel in a suitable manner as by the embedded bolts 84 and nuts 86. The bolts are rigidly secured to a plate 88 that is molded into the blocks. If desired, a particularly satisfactory result on icy pavements or other road surfaces may be obtained by extending a ground engaging plate down through the blocks to their lower sides. This structure is clearly illustrated in Figs. 7 and 8 with the ground engaging plate or fin 90. At the forward end of the shoe is a spring or resilient element 92 which holds the forward end of the shoe in a yieldingly higher position than the rear end of the shoe so that the latter will engage a ground or road surface before the forward end of the shoe does. To avoid any remote possibility of the shoe becoming locked to a roadway an upwardly slanting shoe prow designated 94 is rigidly secured at the forward end. If desired, a hand valve such as the one designated 96 may be imposed in the air line that activates the shoe for braking purposes so that the device may be used as an emergency brake as for example if the truck were to become stalled on a hill. This discussion completes the description of the structure of the device and I turn now to a description of the operation and advantages of my invention.

Figure 2:
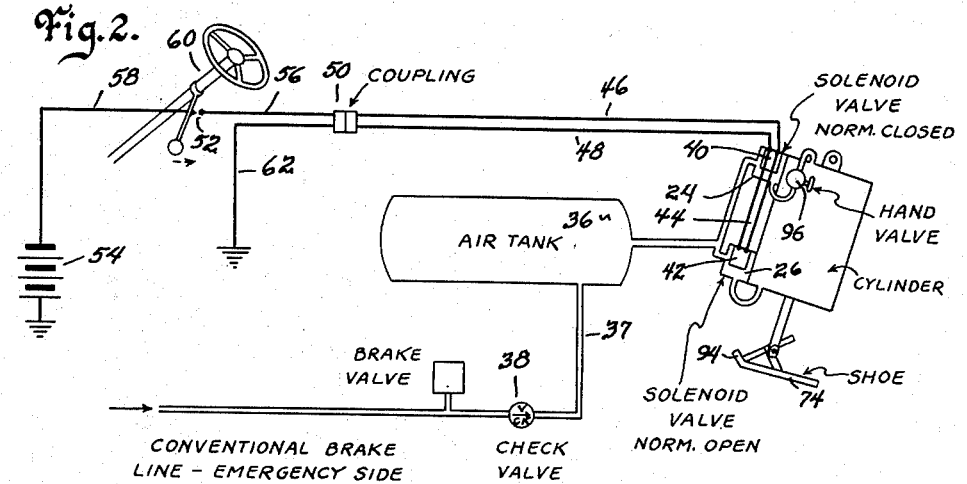
Fig. 2 is a schematic showing of the electrical and hydraulic circuit of my invention.

The operation of my device is very easy to understand, particularly when considered with the wiring diagram and schematic showing of the device in Fig. 2. Whenever the trailer 12 begins to skid or in the event that road conditions lead the operator to anticipate a skid when the brakes are applied, the switch lever on steering column 60 is moved to close the switch 52. As soon as this switch is closed, a complete circuit is formed between the solenoids and the battery 54. Solenoid 42 actuates valve 26 to connect the lower portion of the cylinder 14 to the surrounding atmosphere and also to seal off conduit 34 to prevent air from tank 36 from escaping. Simultaneously with the valve action described above, solenoid 40 actuates valve 26 to seal the upper part of cylinder 14 from the surrounding atmosphere and at the same time connects line 32 to interior of cylinder 14 above piston 22. Pressure from air tank 36 is applied to the top of piston 22, therefore, and it moves down carrying the piston rod 80 down also. The rod transmits the force of piston 22 to the yoke 64 and plate 78. The yoke hinges down causing the rear ends of the shoe legs to engage the road surface. Continued downward movement of piston 22 after the rear ends of shoe 74 engages the road causes the spring 92 to be overpowered. The entire shoe is brought into contact with the roadway, therefore, and this entire process requires a very short time to occur. In the actual tests, there was a delay of only about one second between the closing of the switch and the full contact of the shoe with the road surface. Obviously, almost no time is lost before the effect of the shoe makes itself felt. Prow 94 causes the shoe to ride over any irregular road surfaces such as those that occur as a result of severe winter weather. When the switch is turned "off," the spring loaded valves return to their original positions which cause the piston to retract the shoe.

My invention proved to be very efficacious when tested on a truck. The tractor and trailer were purposely engaged in a skid that would cause "jackknifing," but control was readily regained as soon as my anti-jackknifing device was energized. Also on iced road surfaces, the distance required to stop the truck was greatly reduced by using my invention. Also, it was found that the device was extraordinarily effective if used on ice with the block 82 removed from the shoe. The operator could easily remove these blocks during particularly bad weather, therefore, by removing the nuts from bolts 84. By the same token, it is very easy to shift the blocks around to distribute the wear on the blocks evenly.

The hand valve 96 is particularly valuable on such occasions as when the rig or at least the trailer must be left on inclined surfaces for extended periods. Tests made on an 8% grade disclosed no movement of the truck after two days of parking. The truck was also successfully held against accidental rolling by my invention for as long as thirty minutes without the use of the hand valve. These tests were made without setting any other brakes which discloses the value of the device in the event of brake failure. The hand valve also permits the use of the shoe for emergency parking without having the tractor and trailer connected. Such use is highly important at times such as when the tractor becomes inoperative while away from a maintenance station and a change of tractors is at desirable and perhaps necessary. Primarily, however, the use of my invention is to prevent jackknifing and the serious loss from property damage and bodily injury that usually follows in its wake. Also, the prevention of jackknifing is done in the theoretically correct manner by yieldingly anchoring the trailer near its rear. It is my entire combination of parts that makes my device particularly valuable, and I also rely on the rapid acting air cylinder and curved V shoe for novelty.

Some changes may be made in the construction and arrangement of my emergency braking and anti-jackknifing device for towed vehicles without departing from the real spirit and purpose of my invention, and it is my intention to cover by my claims, any modified forms of structure or use of mechanical equivalents which may be reasonably included within their scope.

I claim:

1. In an anti-jackknifing device for towed vehicles, a shoe comprising, an inverted channel member; said inverted channel member having holes in its top, at least one ground engaging element comprising a metallic portion having resilient material molded around it, studs secured to the metal portion of said ground engaging element; said studs extendable through the holes in said inverted channel member top when said ground engaging element is embraced by said inverted channel member, and nuts threadably engaging said studs to secure said ground engaging element in said inverted channel member and release said ground engaging element from said channel member selectively; whereby said studs and nuts serve primarily to hold said ground engaging element in said inverted channel member and the latter is the major source of support for said ground engaging element.

2. In an anti-jackknifing device for towed vehicles, a shoe comprising, an inverted curved channel member; said inverted channel member having holes in its top, a plurality of straight ground engaging elements comprising a metallic portion having resilient material molded around it, studs secured to the metal portion of said ground engaging element; said studs extendable through the holes in said inverted channel member top when said ground engaging element is embraced by said inverted channel member, and nuts threadably engaging said studs to secure said ground engaging element in said inverted channel member and release said ground engaging element from said channel member selectively; whereby said studs and nuts serve primarily to hold said ground engaging element in said inverted channel member and the latter is the major source of support for said ground engaging element.

References Cited in the file of this patent

UNITED STATES PATENTS

| Number | Name | Date |
|---|---|---|
| 719,353 | Minney | Jan. 27, 1903 |
| 1,990,101 | Smith | Feb. 5, 1935 |
| 2,017,749 | Brainard | Oct. 15, 1935 |
| 2,049,357 | Daignault | July 28, 1936 |
| 2,062,931 | Raffa | Dec. 1, 1936 |
| 2,182,044 | Ackerman | Dec. 5, 1939 |
| 2,219,686 | Germann | Oct. 29, 1940 |

FOREIGN PATENTS

| Number | Country | Date |
|---|---|---|
| 351,819 | France | May 15, 1905 |
| 664,378 | Germany | Jan. 17, 1936 |
| 702,041 | Germany | Jan. 30, 1941 |
| 702,240 | Germany | Feb. 3, 1941 |
| 703,138 | Germany | Mar. 1, 1941 |